United States Patent [19]

Tao

[11] 4,367,077
[45] Jan. 4, 1983

[54] INTEGRATED HYDROGASIFICATION PROCESS FOR TOPPED CRUDE OIL

[75] Inventor: John C. Tao, Perkiomenville, Pa.

[73] Assignee: Air Products and Chemicals, Inc., Allentown, Pa.

[21] Appl. No.: 255,593

[22] Filed: Apr. 20, 1981

[51] Int. Cl.³ .............................................. C01B 3/38
[52] U.S. Cl. .................................. 48/213; 48/214 A; 252/373; 423/652
[58] Field of Search .................... 48/211, 213, 214 A, 48/215; 252/373; 423/652

[56] References Cited

U.S. PATENT DOCUMENTS

| | | | |
|---|---|---|---|
| 2,711,419 | 6/1955 | Milbourne et al. | 260/449.6 |
| 2,759,806 | 8/1956 | Pettyjohn et al. | 48/197 |
| 3,424,808 | 1/1969 | Brewer et al. | 260/669 |
| 3,511,624 | 5/1970 | Humphries et al. | 48/197 |
| 3,586,621 | 6/1971 | Pitchford et al. | 48/214 A |
| 3,732,085 | 5/1973 | Carr et al. | 48/214 |
| 3,759,679 | 9/1973 | Franz et al. | 48/213 |
| 3,828,474 | 8/1974 | Quartulli | 48/214 A |
| 3,866,353 | 2/1975 | Krumm et al. | 48/214 |
| 3,870,481 | 3/1975 | Hegarty | 48/213 |
| 3,975,169 | 8/1976 | Gent | 48/214 A |
| 3,990,867 | 11/1976 | Baron | 48/214 A |
| 4,010,008 | 3/1977 | Jo | 48/214 A |
| 4,017,274 | 4/1977 | Galstaun | 48/214 A |
| 4,065,514 | 12/1977 | Bartley et al. | 260/676 R |
| 4,115,075 | 9/1978 | McNamee et al. | 48/197 R |
| 4,209,305 | 6/1980 | Conway et al. | 48/213 |

*Primary Examiner*—S. Leon Bashore, Jr.
*Assistant Examiner*—Michael L. Goldman
*Attorney, Agent, or Firm*—William F. Marsh; E. Eugene Innis; J. C. Simmons

[57] ABSTRACT

Process for converting a relatively high boiling point crude oil fraction, such as a 500°+F. initial boiling point topped crude to synthetic natural gas. In the process, a lower boiling point fraction of the feedstock is hydrogasified while a residual oil fraction of the feedstock is partially oxidized to produce hydrogen for use in the process. A mid-cut fraction between the gasification fraction and the partial oxidation fraction is converted in a combined steam reforming-methanation stage, along with some by-product aromatics, to produce additional synthetic natural gas products.

7 Claims, 1 Drawing Figure

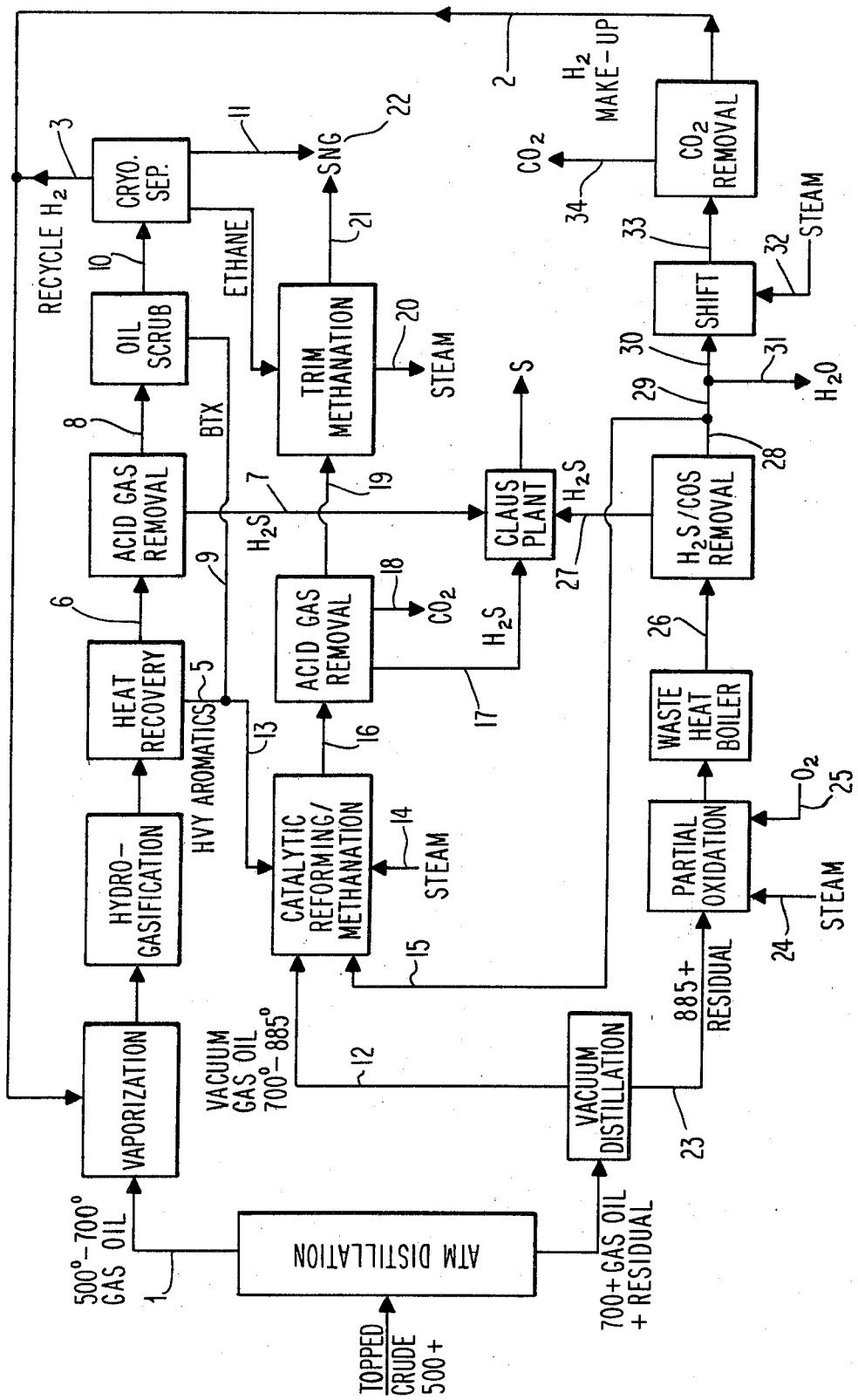

INTEGRATED HYDROGASIFICATION PROCESS FOR TOPPED CRUDE OIL

TECHNICAL FIELD

This invention pertains to a process for making synthetic natural gas from a relatively high boiling point crude oil fraction, such as the fraction remaining when lower boiling components (up to 500° F., for example) are separated from a crude oil feedstock. Such fractions are sometimes referred to as topped crude oil. More specifically, this invention pertains to an enhanced efficiency gas recycle hydrogenation process for making synthetic natural gas from such fractions.

BACKGROUND OF PRIOR ART

A patentability search directed to this invention has identified the following references as of possible interest: U.S. Pat. Nos.

| | |
|---|---|
| 2,711,419 | Milbourne et al |
| 2,759,806 | Pettyjohn et al |
| 3,424,808 | Brewer et al |
| 3,511,624 | Humphries et al |
| 3,759,679 | Franz et al |
| 3,866,353 | Krumm et al |
| 3,870,481 | Hegarty |
| 3,975,169 | Gent |
| 3,990,867 | Baron et al |
| 4,010,008 | Jo |
| 4,017,274 | Galstaun |
| 4,065,514 | Bartley et al |
| 4,115,075 | McNamee et al |
| 4,209,305 | Conway et al |

Additionally, U.S. Pat. No. 3,732,085—Carr et al appears to be of interest.

Carr discloses a process for producing synthetic natural gas from a sulfur-containing crude oil wherein a portion of the 1040+° F. residual is partially oxidized to produce hydrogen and this hydrogen is used to hydrocrack and desulfurize a 375°–1040° F. heavy oil cut to produce naphtha. This naphtha is combined with the naphtha cut from the crude distillation column and the overhead from a vis breaker for conversion to synthetic natural gas in a sequence of units, as illustrated in FIG. 2, including a steam reformer 142, a hydrogasifier 146, and a methanator 150.

In the process of the Conway patent, crude oil is also fractionated into a heavy end which is partially oxidized to produce hydrogen for a hydrogenation process, such as a gas recycle hydrogenation unit (20 in FIG. 1) while a lower boiling point fraction of the crude is gasified such as by a "catalytic-rich gas steam reforming process" (50 in FIG. 1). An ethane stream 45 fractionated from the gasifier product may be combined in this gasification unit 50. It is not known if the process necessarily includes a methanation stage. The cut-off between the middle fraction, which is reformed, and the top fraction, which is hydrogenated in this process, is about 200° C. or 392° F.

U.S. Pat. No. 3,975,169—Gent discloses a process wherein thermal efficiency is enhanced by the combination of sequential steam reforming and methanation to produce synthetic natural gas. There appears to be no suggestion in this patent of the combination of these processes so that the exothermic and endothermic reactions would occur together.

Brewer et al does disclose a catalyst for combined exothermic and endothermic reactions. The reactions involved in Brewer et al, however, are methanation and dehydrogenation (to produce olefins).

Sequential steam reforming and methanation of a hydrocarbon stream is seen in the disclosures of the Milbourne et al, Baron et al, and Jo patents. The further sequential inclusion of hydrogasification in such a process is also seen in the McNamee et al patent. In the latter patent, numerous heat exchangers are included for enhancing the thermal efficiency of the process and reference is made to the exothermic nature of certain of the reactions and endothermic nature of other reactions.

Galstaun is concerned with enhancement of a methanation reaction only, as is Humphries et al which discloses a two-stage methanation process, while Krumm et al relates primarily to a two-stage reforming process.

Franz et al and Bartley et al relate primarily to specific catalysts for hydrocarbon conversion to synthetic natural gas and Pettyjohn et al is of interest, only because of its teaching of steam conversion of a portion of a natural gas liquid feedstock to produce hydrogen for hydrocracking treatment of the remainder of the feedstock.

U.S. Pat. No. 3,870,481—Hegarty, of common assignment with the present invention, is of interest for its teaching of an improved process for the hydrogasification of higher boiling point crude oil fractions by first vaporizing the feedstock in combination with hydrogen and subsequently gasifying the vaporized steam in a gas recycle hydrogenation process.

The background portion of this patent includes an extensive recitation of other processes for making synthetic natural gas, including steam reforming and gas recycle hydrogenation.

Apart from the prior art discussed above, the inventor here is also aware of another process wherein synthetic natural gas is produced in a more thermally efficient manner by a combined steam reforming and methanation process, wherein the exothermic and endothermic reactions are conducted together. However, it is believed that the integration of this process with a hydrogasification process has not been known or suggested by others prior to the present invention.

More specifically, while it has been known that hydrogasification processes, particularly such processes adapted to the gasification of relatively high boiling point hydrocarbon feedstock streams have been known to be a relatively efficient route to produce synthetic natural gas, the efficiency of such a process has been impaired to some extent by the inefficiency of the process in handling materials with a boiling point above 750° F. and in efficiently using the aromatic-rich by-products of the process. One of the difficulties is that if all of the 750° F.+ fraction is partially oxidized (to produce synthesis gas, part of which is then convertible to methane), more hydrogen than can be used in the hydrogasification process is produced.

With all of these factors in view, there remains a need for a more efficient process for converting high boiling point (500° +F.) feedstocks, such as topped crude oil, into synthetic natural gas. More particularly, there remains a need for enhancing the efficiency of gas recycle hydrogenation processes for converting such feedstock to synthetic natural gas.

The general object of the present invention is to provide such a more efficient synthetic natural gas producing process.

BRIEF SUMMARY OF INVENTION

In accordance with the present invention, a lower boiling point fraction of a topped crude oil feedstock (500° +F. B.P. (boiling point) is hydrogasified and a higher boiling point fraction of the feedstock is partially oxidized to produce hydrogen for use in the process, while a steam reforming-methanation stage converts a mid-boiling point fraction, with a boiling range between that of the lower and higher boiling fractions, to produce additional synthetic natural gas product, along with some by-product aromatics.

The end boiling point of the lower boiling fractions (and thus the initial boiling point of the mid-cut fraction) is in the range 650°–750° F., preferably about 700° F. The initial boiling point of the higher boiling fraction (and thus the end point of the mid-cut fraction) is 800°–900° F., preferably 850° F.

Preferably, the steam reforming-methanation stage is combined in a single reactor, as has otherwise been suggested by others. Such a combined steam reforming and methanation stage enhances the efficiency of the gas recycle hydrogenation process, as applied to the lower boiling fraction of the 500° +F. B.P. feedstock, by also receiving the aromatic by-products thereof for catalytic reforming. Preferably also a final methanation reactor in the steam reforming-methanation part of the process also receives an ethane stream separated from the gas recycle hydrogenation products for methanation therein. A carbon monoxide-hydrogen-containing stream from the partial oxidation of the residual oil of the feedstock provides methanation raw material in the methanation-steam reforming stage. Hydrogen produced in this residual oil partial oxidation stage is supplied as make-up in the hydrogasification stage.

BRIEF DESCRIPTION OF DRAWING

The accompanying drawing comprises a block diagram illustration of the process of the present invention, in its preferred embodiment.

DETAILED DESCRIPTION OF INVENTION

As shown in the drawing, in accordance with the process of the present invention, a 500° F. initial boiling point hydrocarbon feedstock is separated, such as in an atmospheric distillation column and vacuum distillation column series, into an overhead fraction, typically a topped crude fraction, which comprises a 500°–700° F. B.P. gas oil stream and a remaining higher boiling bottom fraction (700° + B.P.) from the atmospheric distillation column. This 700° +F. fraction is in turn vacuum distilled into, for example, an 885° +F. residual oil stream 23 and a 700°–885° F. B.P. mid-cut stream 12. The 500°–700° F. gas oil stream is converted into a synthetic natural gas stream by a gas recycle hydrogasification unit, preferably a GRH unit, sold by the British Gas Company. This unit comprises an adiabatic reactor in which is maintained a hydrogen atmosphere at elevated temperature and pressure. The gas recycle hydrogasification feed, along with incoming hydrogen, is preferably vaporized prior to gasification.

The gasification unit product stream 6 is first cooled and, after removal of heavy aromatics stream 5, is solvent washed for acid gas removal and oil scrubbed for removal of a light aromatic (BTX-benzene, toluene, and xylene) stream 9. The remaining product 10 is cryogenically separated into recycle hydrogen 3, ethane, and the purified synthetic natural gas product 11. The heavy aromatics 5 and BTX stream 9 removed from the gasification products are combined with the vacuum gas oil 700°–885° F. B.P. mid-cut fraction 12 and subjected to a combined catalytic reforming and methanation stage, wherein competing endothermic and exothermic reactions occur under the influence of suitable catalysts, steam, and additional hydrogen. Product stream 16 of this combined reforming-methanation stage is solvent washed for acid gas removal and subjected to a final or trim methanation stage, which may also receive the ethane stream separated from the gasification product stream 10. The purified and upgraded reforming-methanation product stream 21 combined with separated synthetic natural gas stream 11 comprises final product stream 22.

The 885° +F. boiling point vacuum residual fraction 23 is partially oxidized to produce, after cooling in a waste heat boiler and solvent washing for removal of acid gases, a hydrogen, carbon dioxide, carbon monoxide stream 28, part 15 of which comprises part of the feed to the combined catalytic reforming-methanation stage. The remainder of the partially oxidized residual stream, after removal of water is subjected to a shift reaction for conversion of carbon monoxide to carbon dioxide and hydrogen, following which a $CO_2$ off-gas 34 is removed and the remaining hydrogen 2 is recycled to the gas recycle hydrogasification stage.

Hydrogen sulfide streams 7, 17, 27, removed in the acid gas wash from each of the three stage product streams, is converted to a sulfur by-product stream in a Claus plant.

In the manner, the topped crude feedstock is efficiently converted through the integrated gasification and combined catalytic reforming/methanation stages, together with partial oxidation of the residual fraction, to an enhanced synthetic natural gas product stream.

As a more specific example, the following Table comprises a calculated mass balance for a process, as described above, wherein the hydrogasification unit is a GRH unit, the combined catalytic reforming methanation stage is a Syntar unit, developed by Parsons, Inc. of Pasadena, Calif., and a separate ethane stream is not separated from synthetic natural gas stream 11.

TABLE

| Point No. | 1 | 2 | 3 | 4 | 5 | 6 | 7 | 8 | 9 | 10 | 11 | 12 |
|---|---|---|---|---|---|---|---|---|---|---|---|---|
| Point No. ID | Oil to GRH | Make-Up $H_2$ | Recycle $H_2$ | Hydrog. Gas | Heavy Arom. | GRH Prod. Gas | $H_2S$ | GRH Prod. Gas | Light Arom. | GRH Prod. Gas | GRH SNG | Oil to Syntar |
| Phase | Liquid | Vapor | Vapor | Vapor | Liquid | Vapor | Vapor | Vapor | Liquid | Vapor | Vapor | Liquid |
| Units | Lbs. | Lbs. | Lbs. | Lbs. | Lbs. | Lbs. | Lbs. | Lbs. | Lbs. | Lbs. | Lbs. | Lbs. |
| $H_2$ | | 2.5862 | 2.9432 | 5.5294 | | 2.9432 | | 2.9432 | | 2.9432 | | |
| CO | | | | | | | | | | | | |
| $CO_2$ | | | | | | | | | | | | |
| $H_2O$ | | | | | | | | | | | | |
| $CH_4$ | | | 2.6022 | 2.6022 | | 17.4744 | | 17.4744 | | 17.4744 | 14.8722 | |
| $O_2$ | | | | | | | | | | | | |
| $H_2S$ | | | | | | .8271 | .8271 | | | | | |
| C | 33.3372 | | | | | | | | | | | 29.8531 |
| S | .7782 | | | | | | | | | | | 1.1327 |
| H | 4.7967 | | | | | | | | | | | 3.8670 |
| Total M.W. | 38.9121 277 | 2.5862 | 5.5454 | 8.1316 | 6.2298* | 40.9135* | .8271 | 40.0864* | 5.0663* | 34.9201* | 29.3747* | 34.8528 |
| Remarks | 500–700° F. cut | | 90% $H_2$ 10% $CH_4$ | | *3.6616 lbs. Naphthalene, 2.5682 lbs. Anthracene | *Includes $C_2H_6$ 12.8447 $C_2H_4$ 1.1169 $C_3H_6$ .6409 B 4.5597 T .2533 X .2533 | | *Includes All of Stream 6 Except $H_2S$ | *Includes B 4.5597 T .2533 X .2533 | *Includes $C_2H_6$ 12.8447 $C_2H_4$ 1.1169 $C_3H_6$ .5409 | *Includes $C_2H_6$ 12.8447 $C_2H_4$ 1.1169 $C_3H_6$ .5409 | 700–885° F. cut |

| Point No. | 13 | 14 | 15 | 16 | 17 | 18 | 19 | 20 | 21 | 22 | 23 | 24 |
|---|---|---|---|---|---|---|---|---|---|---|---|---|
| Point No. ID | Arom. from GRH | Steam to Syntar | Syngas | Syntar Prod. Gas | $H_2S$ | $CO_2$ | Syntar Prod. Gas | Steam | Syntar SNG | SNG | Oil to POX | Steam to POX |
| Phase | Liquid | Vapor | Vapor | Vapor | Vapor | Vapor | Vapor | Vapor | Vapor | Vapor | Liquid | Liquid |
| Units | Lbs. | Lbs. | Lbs. | Lbs. | Lbs. | Lbs. | Lbs. | Lbs. | Lbs. | Lbs. | Lbs. | Lbs. |
| $H_2$ | | | 6.5955 | .4707 | | | .4707 | | | | | |
| CO | | | 100.8108 | 2.1793 | | | 2.1793 | | | | | |
| $CO_2$ | | | 13.3034 | 140.6390 | | 140.6390 | | | | | | |
| $H_2O$ | | 14.6147 | | 50.8868 | | | 1.4016 50.8868 | | | | | |
| $CH_4$ | | | | | | | | | 52.1351 | 67.0073 | | 32.3564 |
| $O_2$ | | | | | | | | | | | | |
| $H_2S$ | | | | 1.2039 | 1.2039 | | | | | | | |
| C | 26.1970 | | | | | | | | | | 55.6072 | |
| S | | | | | | | | | | | 3.1922 | |
| H | | | | | | | | | | | 6.3478 | |
| Total | 11.2961* | 26.1970 | 135.3244 | 207.6704* | 1.2039 | 65.8275* | 1.4016 | 64.4258* | 93.8005* | 65.1472 | 32.3564 | |
| M.W. | | | | | | | | | | | | |
| Remarks | *Includes B 4.5597 T .2533 X .2533 N** 3.6616 A** 2.5682 | | | *Includes $C_2H_6$ 12.2907 | | | *Includes $C_2H_6$ 12.2907 | | *Includes $C_2H_6$ 12.2907 SNG Composition 88.83% $CH_4$ 11.17% $C_2H_6$ 100% | *Includes $C_2H_6$ 25.1354 $C_2H_4$ 1.1169 $C_3H_6$ .5409 SNG is 82.46% $CH_4$, 16.50% $C_2H_6$, .79% $C_2H_4$, .25% $C_3H_6$ | 885° F. + cut | |

| Point No. | 25 | 26 | 27 | 28 | 29 | 30 | 31 | 32 | 33 | 34 |
|---|---|---|---|---|---|---|---|---|---|---|
| Point No. ID | $O_2$ to POX | POX Prod. Gas | $H_2S$ | POX Prod. Gas | Gas to Shift | Gas to Shift | Water | Steam | Shift Prod. Gas | $CO_2$ |
| Phase | Vapor | Vapor | Vapor | Vapor | Vapor | Vapor | Liquid | Vapor | Vapor | Vapor |

TABLE-continued

| Units | Lbs. | Lbs. | Lbs. | Lbs. | Lbs. | Lbs. | Lbs. | Lbs. |
|---|---|---|---|---|---|---|---|---|
| $H_2$ | | 7.8270 | | 7.8270 | 1.2315 | 1.2315 | | |
| CO | | 119.6314 | | 119.6314 | 18.8206 | 18.8206 | | |
| $CO_2$ | | 15.7900 | | 15.7900 | 2.4866 | 2.4866 | | |
| $H_2O$ | | 17.3440 | | 17.3440 | 2.7293 | | 2.7293 | |
| $CH_4$ | | | | | | | | |
| $O_2$ | 66.4812 | | | | | | | |
| $H_2S$ | | 3.3929 | 3.3929 | | | | | 2.5862 |
| C | | | | | | | | |
| S | | | | | | | 12.1043 | 32.0569 |
| H | | | | | | | | |
| Total | 66.4812 | 163.9853 | 3.3929 | 160.5924 | 25.2680 | 22.5387 | 2.7293 12.1043 | 34.6431 32.0569 |
| M.W. | | | | | | | | |
| Remarks | | | | | | | | |

**N = Napthalene
A = Anthracene

While this invention has been described with reference to specific details and embodiments, it is apparent that other embodiments and variations in the basic process may be made without departing from the true spirit and scope of the present invention. For example, while the end boiling point of the gasification fraction may be in the range from 650°–750° F., and the initial boiling point of the vacuum residual fraction (which is subjected to partial oxidation) may be in the range of 800°–900° F., specific temperature limits within these ranges may be selected in view of feedstock characteristics, the impact of other operating process parameters, and specific process objectives.

In any event, it is intended that the appended claims be construed to encompass not only the specific embodiments and variations of the invention shown and described, but also to encompass all other such embodiments and variations which may be devised by those skilled in the art, without departing from the true spirit and scope of the present invention.

I claim:

1. Process for making synthetic natural gas from a topped crude oil fraction feedstock comprising:
   (a) separating said feedstock by distillation into three sub-fractions having boiling point ranges of
      (i) below 750° F.;
      (ii) above 800° F.;
      (iii) above that of subfraction (i) and below that of sub-fraction (ii);
   (b) partially oxidizing sub-fraction (ii) to produce a hydrogen, carbon monoxide, and carbon dioxide stream, separating a part of said stream as a carbon monoxide-hydrogen-rich stream and shifting the remainder of said stream to produce a hydrogen-rich stream therefrom;
   (c) hydrogenating sub-fraction (i) by noncatalytic hydrogasification to produce a low boiling point gas mixture, aromatics, and hydrogen, and separating said aromatics and hydrogen therefrom;
   (d) catalytically reforming and methanating said fraction (iii) and said aromatics of step (c) in a combined reaction stage to produce a low boiling point gas mixture which is then subjected to a trim methanation step to increase the methane content of the mixture;
   (e) recycling said hydrogen-rich stream removed from the product of said partial oxidation to said hydrogenation stage;
   (f) recycling said carbon monoxide-hydrogen-rich stream from said partial oxidizing stage to said catalytic reforming and methanation stage;
   (g) recovering said remaining low boiling point gas mixtures from said hydrogenation and catalytic reforming stages as a synthetic natural gas product.

2. Process, as recited in claim 1, wherein ethane is separated from said hydrogenated sub-fraction (i) products, after the separation of aromatics therefrom, and said ethane is treated in said trim methanation stage.

3. A process, as recited in claim 1, wherein said crude oil fraction feedstock has an initial boiling point of 500° F., and the boiling point range of said sub-fraction (i) is below 700° F.

4. A process, as recited in claim 1, wherein said crude oil fraction feedstock has an initial boiling point of 500° F., and the boiling point range of said sub-fraction (i) is below 650° F.

5. A process, as recited in claim 1, wherein the boiling point range of sub-fraction (ii) is above 850° F.

6. A process, as recited in claim 1, wherein the boiling point range of sub-fraction (ii) is above 900° F.

7. A process, as recited in claim 1, wherein said crude oil fraction feedstock has an initial boiling point of 500° F., the boiling point range of said sub-fraction (i) is below 700° F., and the boiling point range of sub-fraction (ii) is above 850° F.

* * * * *

UNITED STATES PATENT AND TRADEMARK OFFICE
CERTIFICATE OF CORRECTION

PATENT NO. : 4,367,077

DATED : 4 January 1983

INVENTOR(S) : John C. Tao

Page 1 of 2

It is certified that error appears in the above-identified patent and that said Letters Patent is hereby corrected as shown below:

In the specification, at column 6, in the Table:

at Point No. 18, the Total number should be inserted as --140.6390-- and the number "65.8275*" should be deleted.

at Point No. 19, the $H_2O$ number "1.4016" should be deleted, the Total number "1.4016" should be deleted and the Total number --65.8275*-- should be inserted in its place.

at Point no. 20, the $H_2O$ number --1.4016-- should be inserted, the Total number "64.4258*" should be deleted and the Total number --1.4016-- should be inserted in its place.

at Point No. 21, the Total number "93.8005*" should be deleted and the number --64.4258*-- inserted in its place.

at Point 22, the Total number "65.1472" should be deleted and the number --93.8005*-- should be inserted in its place.

at Point No. 23, the $H_2O$ number "32.3564" should be deleted, the Total number "32.3564" should be deleted and the Total number --65.1472-- inserted in its place.

UNITED STATES PATENT AND TRADEMARK OFFICE
CERTIFICATE OF CORRECTION

PATENT NO. : 4,367,077   Page 2 of 2

DATED : 4 January 1983

INVENTOR(S) : John C. Tao

It is certified that error appears in the above-identified patent and that said Letters Patent is hereby corrected as shown below:

at Point No. 24, the $H_2O$ number --32.3564-- should be inserted and the Total number --32.3564-- should be inserted.

Signed and Sealed this

Seventeenth Day of May 1983

[SEAL]

Attest:

DONALD J. QUIGG

Attesting Officer   Acting Commissioner of Patents and Trademarks